United States Patent
Pandey et al.

(10) Patent No.: US 10,887,781 B2
(45) Date of Patent: Jan. 5, 2021

(54) MACHINE LEARNING-BASED APPROACH TO NETWORK PLANNING USING OBSERVED PATTERNS

(71) Applicant: Cisco Technology, Inc., San Jose, CA (US)

(72) Inventors: Santosh Ghanshyam Pandey, Fremont, CA (US); Jean-Philippe Vasseur, Saint Martin d'uriage (FR); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/880,617

(22) Filed: Jan. 26, 2018

(65) Prior Publication Data

US 2019/0239100 A1     Aug. 1, 2019

(51) Int. Cl.
| | | |
|---|---|---|
| *H04W 24/04* | (2009.01) | |
| *H04W 36/08* | (2009.01) | |
| *G06N 3/08* | (2006.01) | |
| *H04L 12/24* | (2006.01) | |
| *H04W 24/02* | (2009.01) | |
| *H04W 36/16* | (2009.01) | |
| *H04W 36/38* | (2009.01) | |
| *H04W 24/08* | (2009.01) | |

(52) U.S. Cl.
CPC .............. *H04W 24/04* (2013.01); *G06N 3/08* (2013.01); *H04L 41/142* (2013.01); *H04L 41/16* (2013.01); *H04W 24/02* (2013.01); *H04W 36/08* (2013.01); *H04L 41/145* (2013.01); *H04L 41/147* (2013.01); *H04W 24/08* (2013.01); *H04W 36/165* (2013.01); *H04W 36/38* (2013.01)

(58) Field of Classification Search
None
See application file for complete search history.

(56) References Cited

U.S. PATENT DOCUMENTS

| | | | |
|---|---|---|---|
| 9,467,918 B1* | 10/2016 | Kwan | H04W 36/30 |
| 2007/0054670 A1 | 3/2007 | Kalika et al. | |
| 2008/0182583 A1 | 7/2008 | Le et al. | |
| 2009/0257353 A1* | 10/2009 | Song | H04W 24/02 |
| | | | 370/241 |
| 2014/0043983 A1* | 2/2014 | Huang | H04L 41/0677 |
| | | | 370/244 |
| 2015/0365833 A1 | 12/2015 | Stafford et al. | |
| 2017/0026888 A1* | 1/2017 | Kwan | H04W 36/245 |
| 2017/0215085 A1* | 7/2017 | Udeshi | H04W 16/18 |
| 2018/0109975 A1* | 4/2018 | Kalliola | H04W 24/04 |

* cited by examiner

*Primary Examiner* — Charles C Jiang
*Assistant Examiner* — Saad Khawar
(74) *Attorney, Agent, or Firm* — Behmke Innovation Group LLP; Kenneth J. Heywood; James J. Wong

(57) ABSTRACT

In one embodiment, a network assurance service that monitors a wireless network identifies a set of wireless network anomalies detected in the wireless network that are associated with a set of one or more network measurements. The network assurance service classifies the set of wireless anomalies as radio-related or backend-related. The network assurance service, when the set of wireless anomalies are classified as radio-related, determines that the wireless anomalies are recurring for a particular wireless access point in the network. The network assurance service initiates a change to the wireless network in part to move clients in the wireless network from the particular wireless access point to another wireless access point in the network.

18 Claims, 10 Drawing Sheets

MACHINE LEARNING-BASED APPROACH TO NETWORK PLANNING USING OBSERVED PATTERNS

TECHNICAL FIELD

The present disclosure relates generally to computer networks, and, more particularly, to a machine learning-based approach to network planning using observed patterns.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
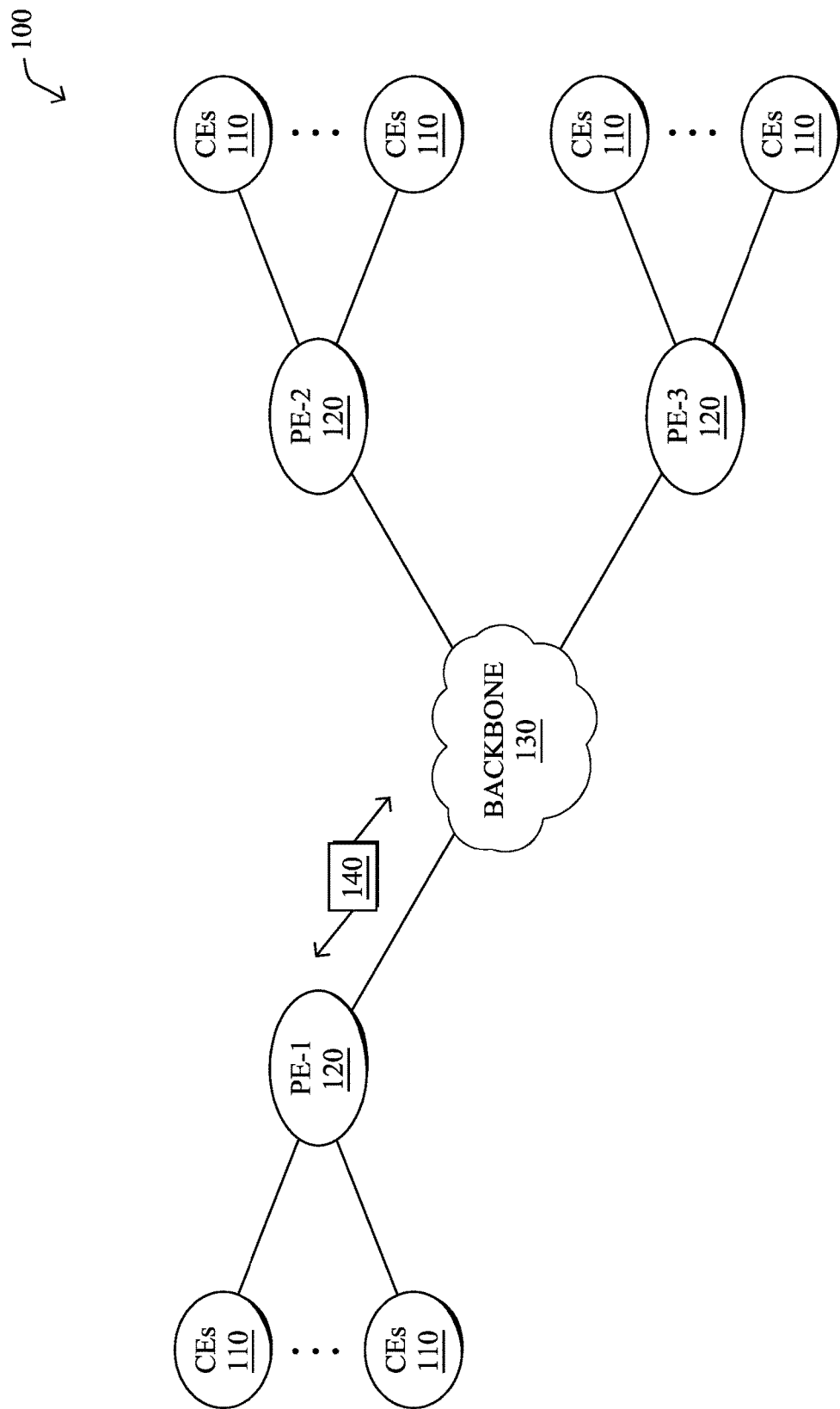
FIGS. 1A-1B illustrate an example communication network.

According to one or more embodiments of the disclosure, a network assurance service that monitors a wireless network identifies a set of wireless network anomalies detected in the wireless network that are associated with a set of one or more network measurements. The network assurance service classifies the set of wireless anomalies as radio-related or backend-related. The network assurance service, when the set of wireless anomalies are classified as radio-related, determines that the wireless anomalies are recurring for a particular wireless access point in the network. The network assurance service initiates a change to the wireless network in part to move clients in the wireless network from the particular wireless access point to another wireless access point in the network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
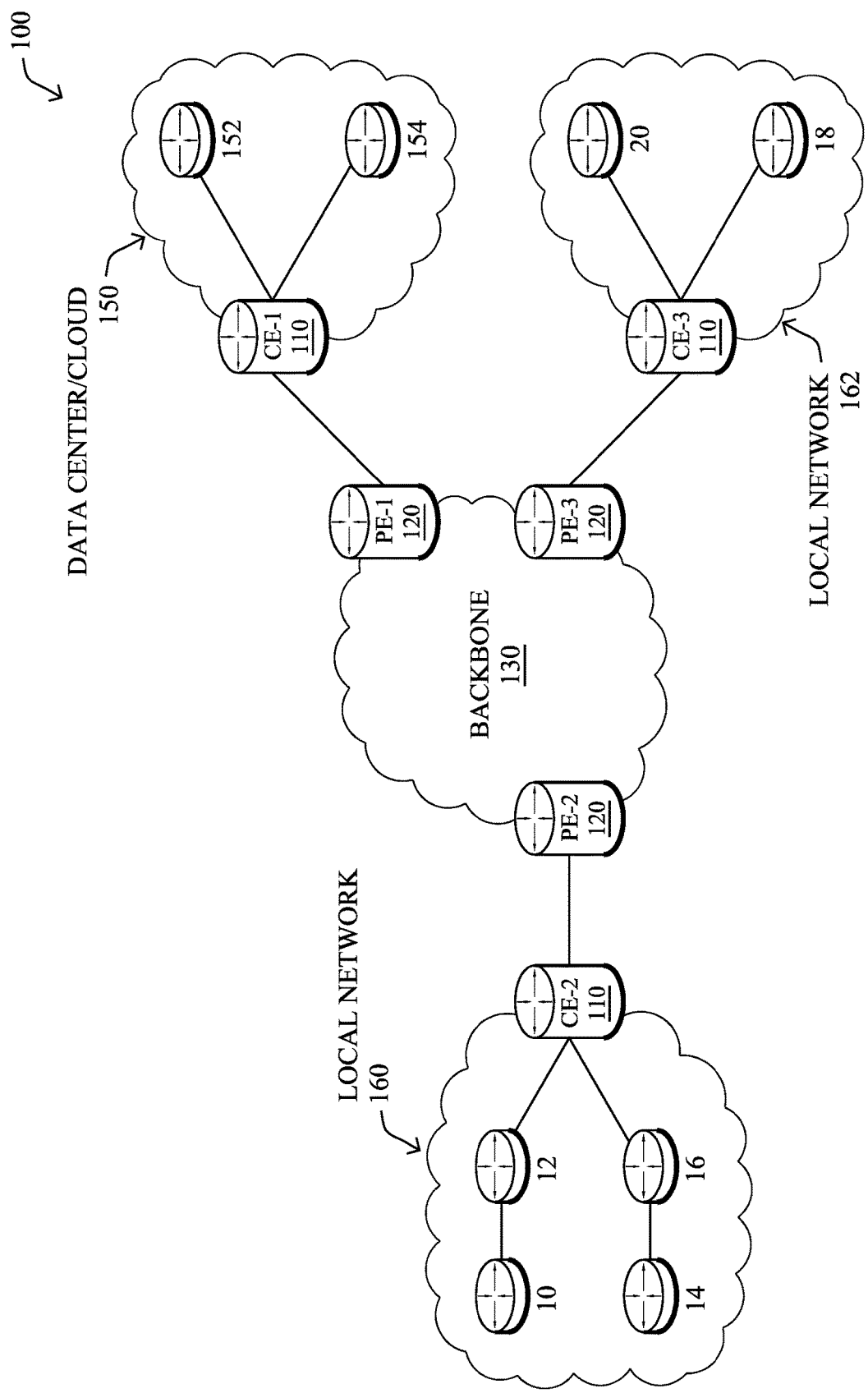

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
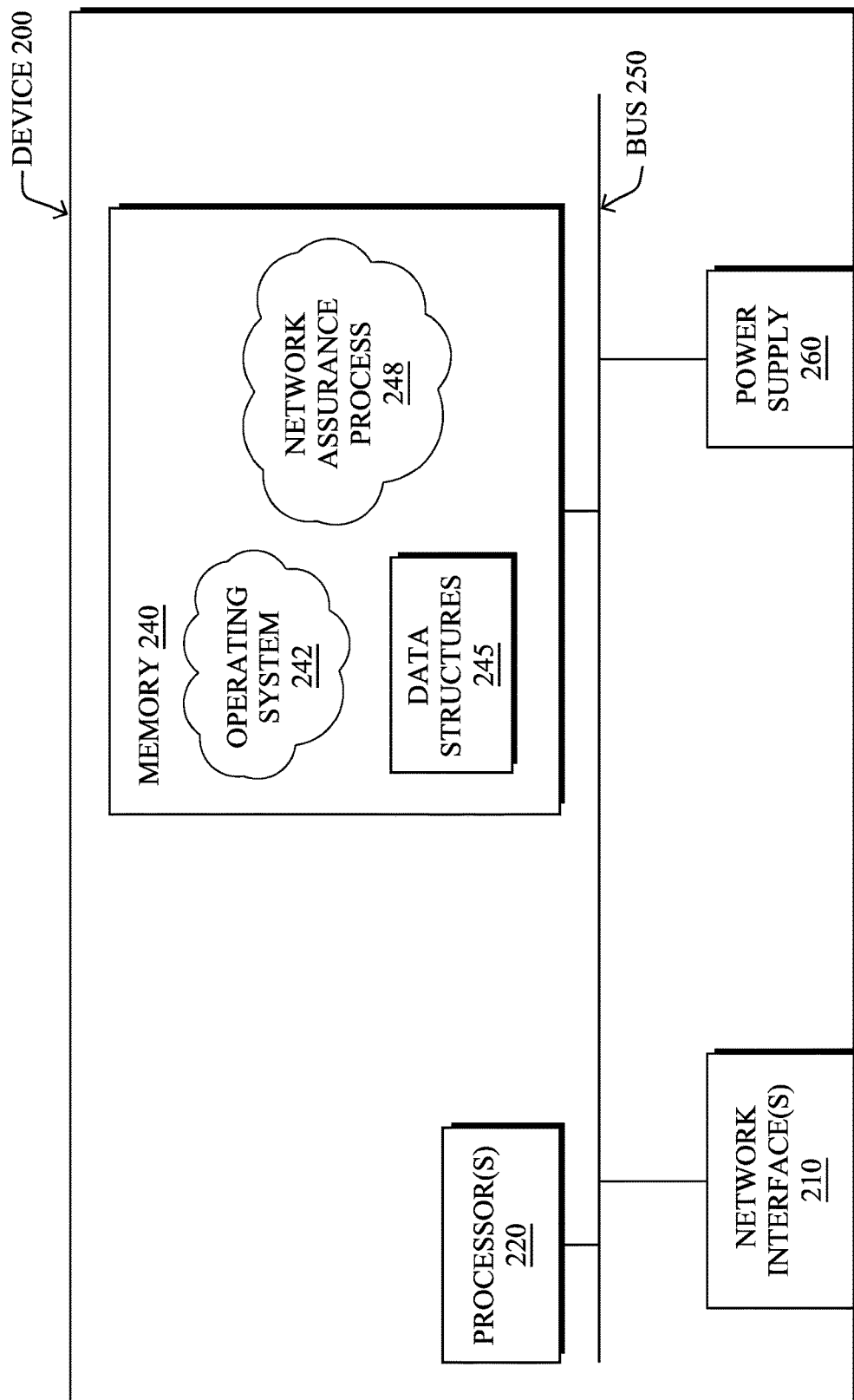
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true is positives the sum of true and false positives.

Figure 3:
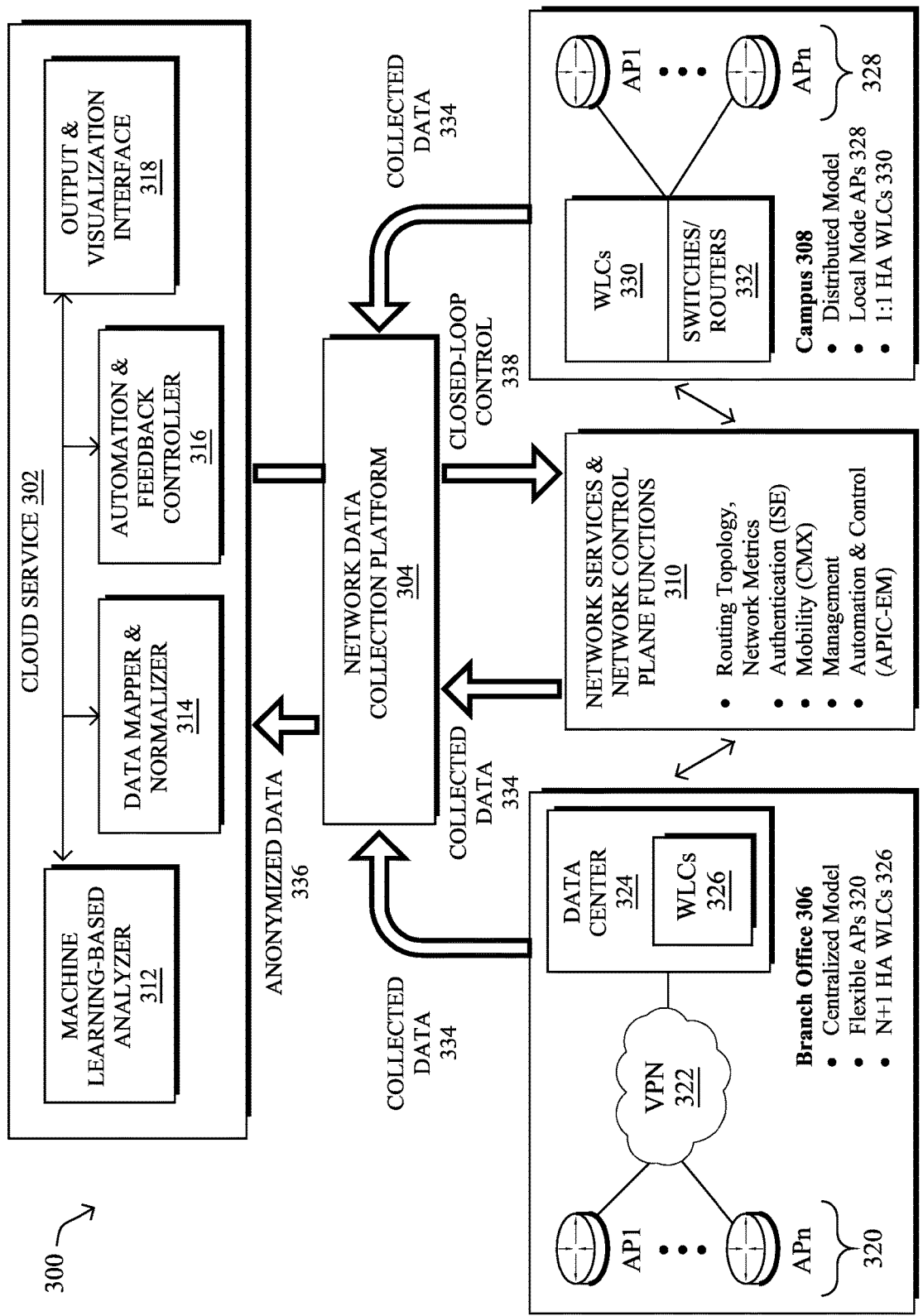
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point API through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point API through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, a network assurance service may monitor a wireless network and detect existing and potential problems in the network. For example, in wireless networks, such as Wi-Fi networks, roaming events are triggered when a client moves from one wireless access point (AP) to another. Based on AP from which the client roams, and the AP to which the client roams, the roaming may be classified into one of three different types: Intra-WLC, Layer-2, or Layer-3 roaming. The handshake and the amount of time required for roaming depends on the type of roaming, with Intra-WLC roaming typically taking the least amount of time. In a typical scenario, the roaming handshake process takes between a few seconds to upwards of 10s of seconds to complete.

In some cases, the delay associated with a roaming handshake is so long that the clients disassociates from the Wi-Fi network. This results in the worst user experience possible, as the client device now needs to associate with the network from scratch (e.g., by performing full authentication, association, DHCP process, etc., again). This takes longer than re-association process during roaming and can disrupt the application in use, such as disrupting the streaming of video to the client.

The disassociation of a client from the network due to roaming problems mainly occurs for the following reasons:

The roaming process took too long and the client reached a timeout. The timeout may be due to Radio Frequency (RF) conditions (e.g., multiple over the air collision that caused the timeout) or backend server load (e.g., the network entity facilitating the roaming handshake was overloaded).

The destination AP to which the client intends to roam has already reached its maximum number of clients and cannot accept new clients The client was located at the edge of wireless coverage and has moved to a location that does not have any APs to which the client can roam.

All of the above issues affect the quality of network and network administrators often spend considerable amounts of time to plan the network in such a way to avoid these roaming issues.

RF conditions may also significantly impact the overall user experience and, in particular, the per-client and per-application throughput. When the wireless signal degrades, the signal to noise ratio (SNR) decreases and packet failures increase. This leads to retransmissions with an exponential back-off and, consequently, a decreased throughput, which can even reach the point where the wireless network is no longer functional for the client.

RF issues may sometimes be due to bursty, high interference/noise in the environment. However, clients may also persistently experience bad RF at certain locations, leading to persistent roaming problems in those locations. Such persistent roaming problems may be mitigated by adding new access points at the proper locations, to improve the signal strengths and, consequently, the overall user experience in terms of key metrics such as on-boarding times and overall throughput. However, identifying the underlying problems that would be alleviated by the addition of a new access point, as well as selecting the optimal location for the new access point, is often challenging, if not impossible, in many networks.

Machine Learning-Based Approach to Network Planning Using Observed Patterns

The techniques herein leverage machine learning in a network assurance service to identify portions of the monitored network that exhibit anomalies/issues, such as roaming failures or throughput anomalies that can impact the user experience. In some aspects, the service may extract out those anomalies/issues that are exclusively RF/radio-related. In turn, the service may execute machine learning models on the RF-related to anomalies/issues to assess potential changes to the network, such as adding one or more new access points to the network.

Specifically, according to one or more embodiments of the disclosure as described in detail below, a network assurance service that monitors a wireless network identifies a set of wireless network anomalies detected in the wireless network that are associated with a set of one or more network measurements. The network assurance service classifies the set of wireless anomalies as radio-related or backend-related. The network assurance service, when the set of wireless anomalies are classified as radio-related, determines that the wireless anomalies are recurring for a particular wireless access point in the network. The network assurance service initiates a change to the wireless network in part to move clients in the wireless network from the particular wireless access point to another wireless access point in the network.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4:
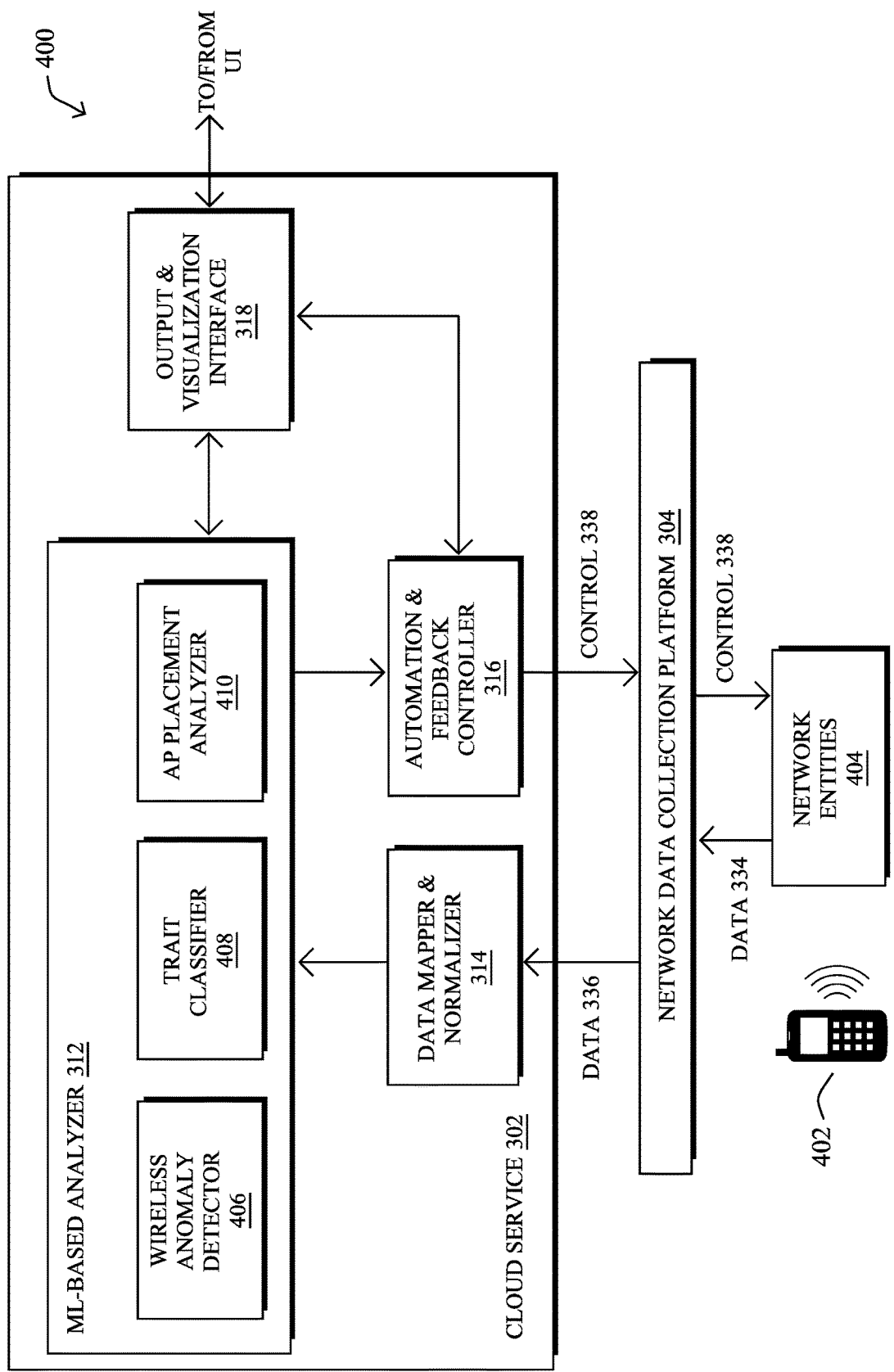
FIG. 4 illustrates an example architecture for using machine learning to assess anomalies/issues in a wireless network.

Operationally, FIG. 4 illustrates an example architecture 400 for using machine learning to assess anomalies/issues in a wireless network, according to various embodiments. At the core of architecture 400 may be the following components: a wireless anomaly detector 406, a trait classifier 408, and/or an AP placement analyzer 410. In some implementations, the components of architecture 400 may be implemented within a network assurance system, such as system 300 shown in FIG. 3. Accordingly, the components 406-410 of architecture 400 shown may be implemented as part of cloud service 302 (e.g., as part of machine learning-based analyzer 312), as part of network data collection platform 304, and/or on one or more network elements/entities 404 that communicate with one or more client devices 402 within the monitored network itself. Further, these components may be implemented in a distributed manner or implemented to as its own stand-alone service, either as part of the local network under observation or as a remote service. In addition, the functionalities of the components of architecture 400 may be combined, omitted, or implemented as part of other processes, as desired.

The techniques herein can be divided into two key functionalities:

1.) Identification and root cause analysis of wireless anomalies, such as roaming/onboarding failures and throughput degradation, that are due to RF/radio-based issues (e.g., as opposed to problems that are caused by backend issues, such as overloaded servers, etc.).

2.) Assessment of changes to the network, such as the placement of new APs to resolve the RF issues.

As shown, wireless anomaly detector 406 may assess measurement data collected from the network (e.g., data 334, which may be processed by data mapper and normalized 314), to detect wireless anomalies in the network. These wireless anomalies may include roaming/onboarding failures and/or throughput anomalies (e.g., observed degradation of the wireless throughput). In some embodiments, wireless anomaly detector 406 may detect wireless anomalies based on a set of predefined rules. For example, one rule may define a throughput anomaly as any throughput that falls below a defined threshold. In further embodiments, wireless anomaly detector 406 may use machine learning-based anomaly detection, to detect wireless anomalies. Such approaches typically operate by modeling what is considered to be "normal" behavior and looking for behaviors that statistically deviate from this model. For example, in the case of throughput, the detector may detect significant changes in the measured wireless throughput. A combination of rule-based and machine learning-based anomaly detection approaches is also possible, in further embodiments.

In some embodiments, wireless anomaly detector 406 may identify what are referred to herein as "common traits" of detected anomalies. The following terminology is used herein:

Event: an occurrence of an unusual/unexpected or failure event at a point in time (e.g., a detected anomaly).

Tag: a categorical label that a parameter takes when its (suitably discretized) value lies beyond a threshold.

Trait: a pattern of states in network data that co-occurs with an event, usually associated with one or more parameters (attributes of a trait) and their tags (levels of a trait).

Common trait: a trait that is shared across more than one network gear (e.g. wireless radio), or occurs frequently in time over many networking gears (e.g. radio).

Insight: an insight is information about an event that is derived from the associated trait.

Figures 5A, 5B:
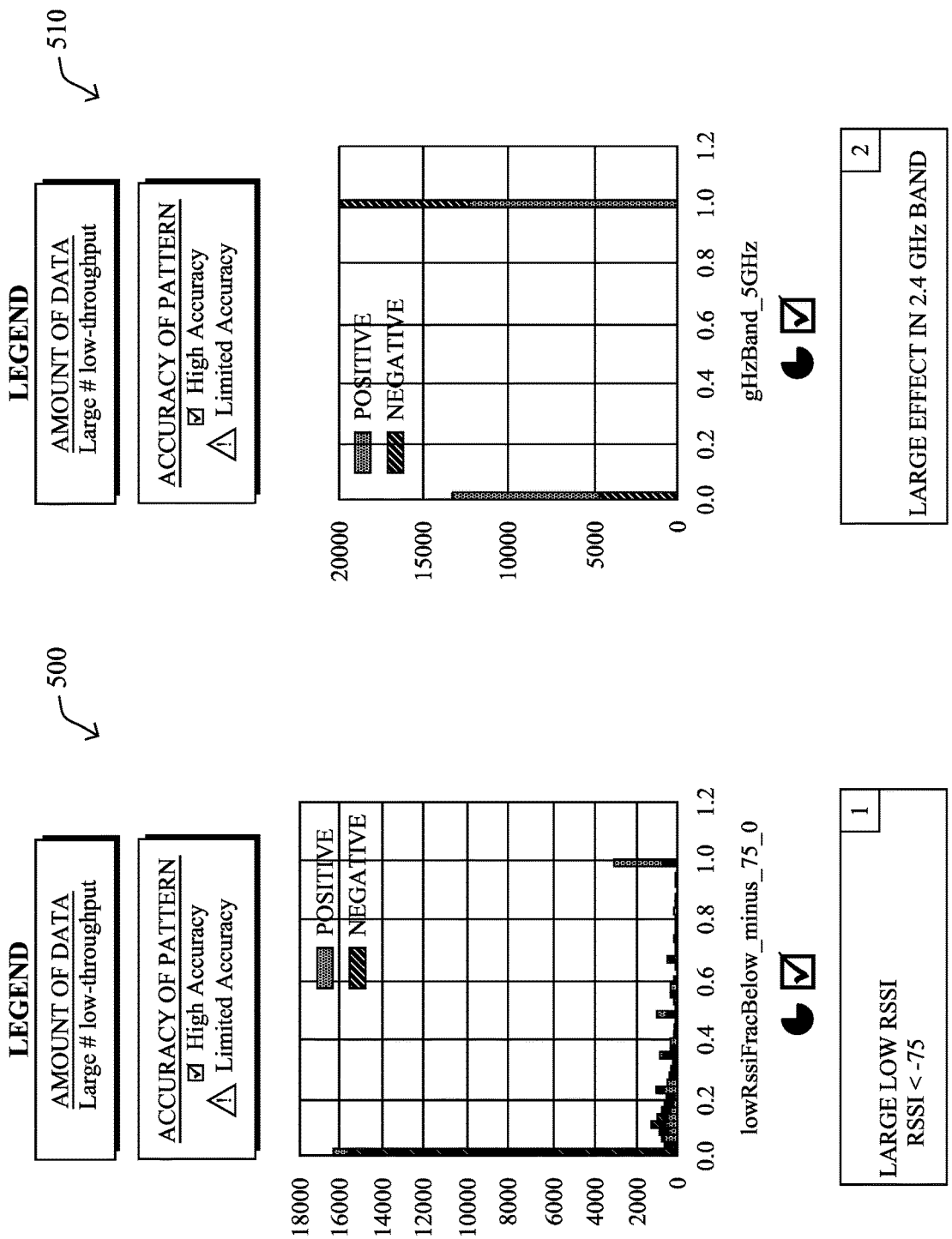
FIGS. 5A-5C illustrate example label distributions for various network measurements.
Figure 5C:
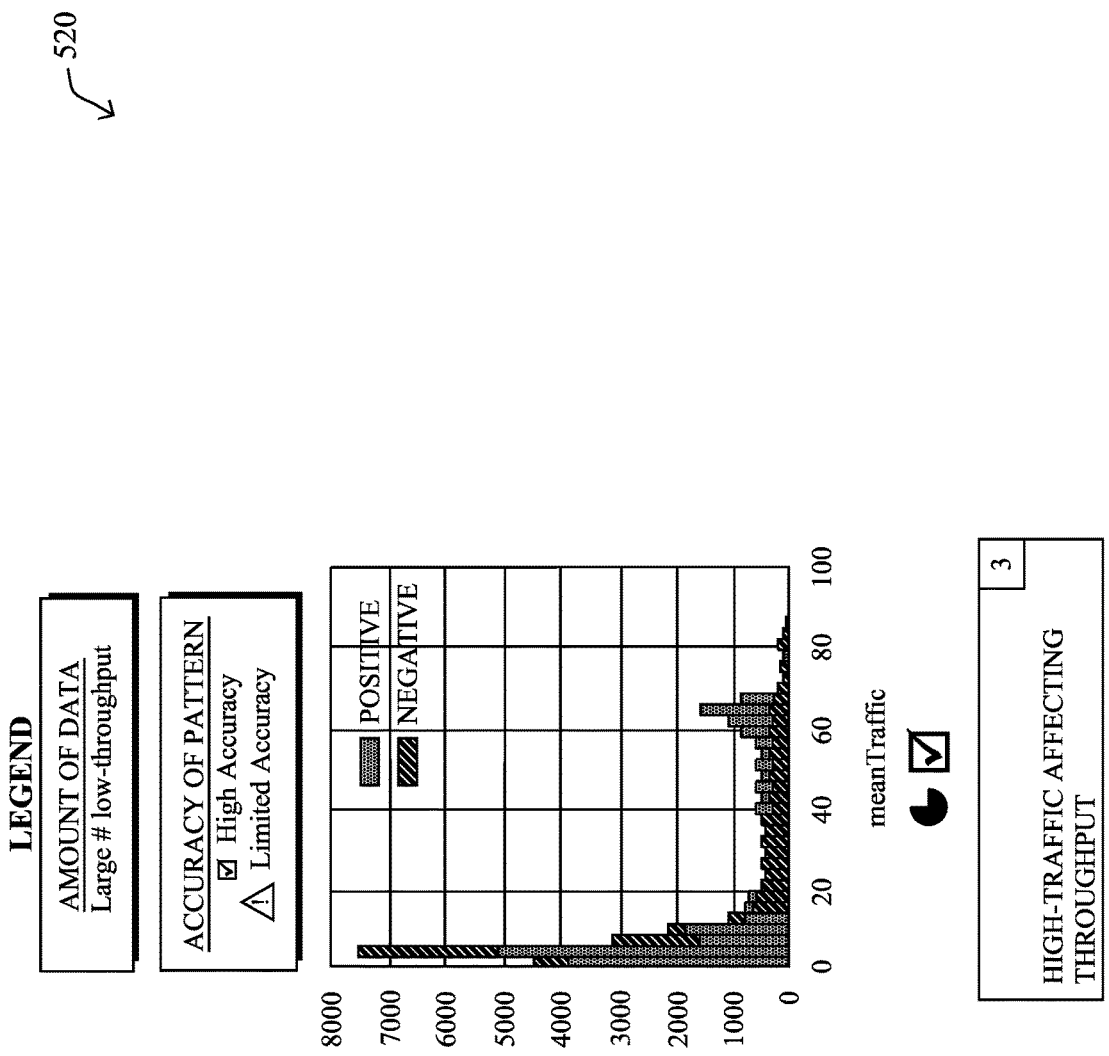

Referring briefly to FIGS. 5A-5C, example label distributions for various network measurements are shown. Notably, plot 500 in FIG. 5A illustrates that when the fraction of low-RSSI packets to total number of received packets is larger than 0.9, then there is a high probability that the positive events (e.g., low-throughput events) ensue. Similarly, as shown by plot 510 in FIG. 5B, low throughput events are also more probably in the 2.4 GHz band, but not the 5 GHz band. In addition, as shown by plot 520 in FIG. 5C, low throughput events are more probable when the mean traffic observed on the air is more than 60%. By assessing the different ranges of measurement values from the monitored network vis-à-vis the detected problems, wireless anomaly detector 406 can identify the thresholds of feature values at which there is a high probability of a positive event (e.g., a roaming failure or throughput anomaly) occurring.

Once wireless anomaly detector 406 has identified the network measurement thresholds at which an anomaly has a high probability of co-occurring, anomaly detector 406 may discretize the range of measurements into tags. For example, in the case of measured interference, anomaly detector 406 may simply tag the measurements as either "low" or "high," based on the threshold. The set of measurements and their tags that have a high probability of co-occurring with a given anomaly/failure is then considered a trait.

Traits that are shared across different devices are then considered common traits, which service 302 can use to detect the attributes that are most related to high onboarding failures or abnormal throughput. In some cases, service 302 may also generate insights based on the identified traits and provide them to a user interface (UI), allowing an administrator to easily assess the network conditions that may be responsible for a given anomaly/failure. For example, one insight may indicate that low throughput is often associated with APs on the 5 GHz band and have more than thirty clients.

Referring again to FIG. 4, trait classifier 408 may be configured to classify whether a trait is radio-related (e.g., due to an RF condition) or backend-related (e.g., due to a backend issue), in various embodiments. This may be achieved via application of a set of rules to the traits. This allows trait classifier 408 to label roaming failure events to be either radio-related or backend-related. The same reasoning also applies to throughput anomalies in which trait classifier 408 may determine whether the trait is a common trait and, based on this, determine whether the throughput anomaly is due to RF or backend issues.

Figure 6:
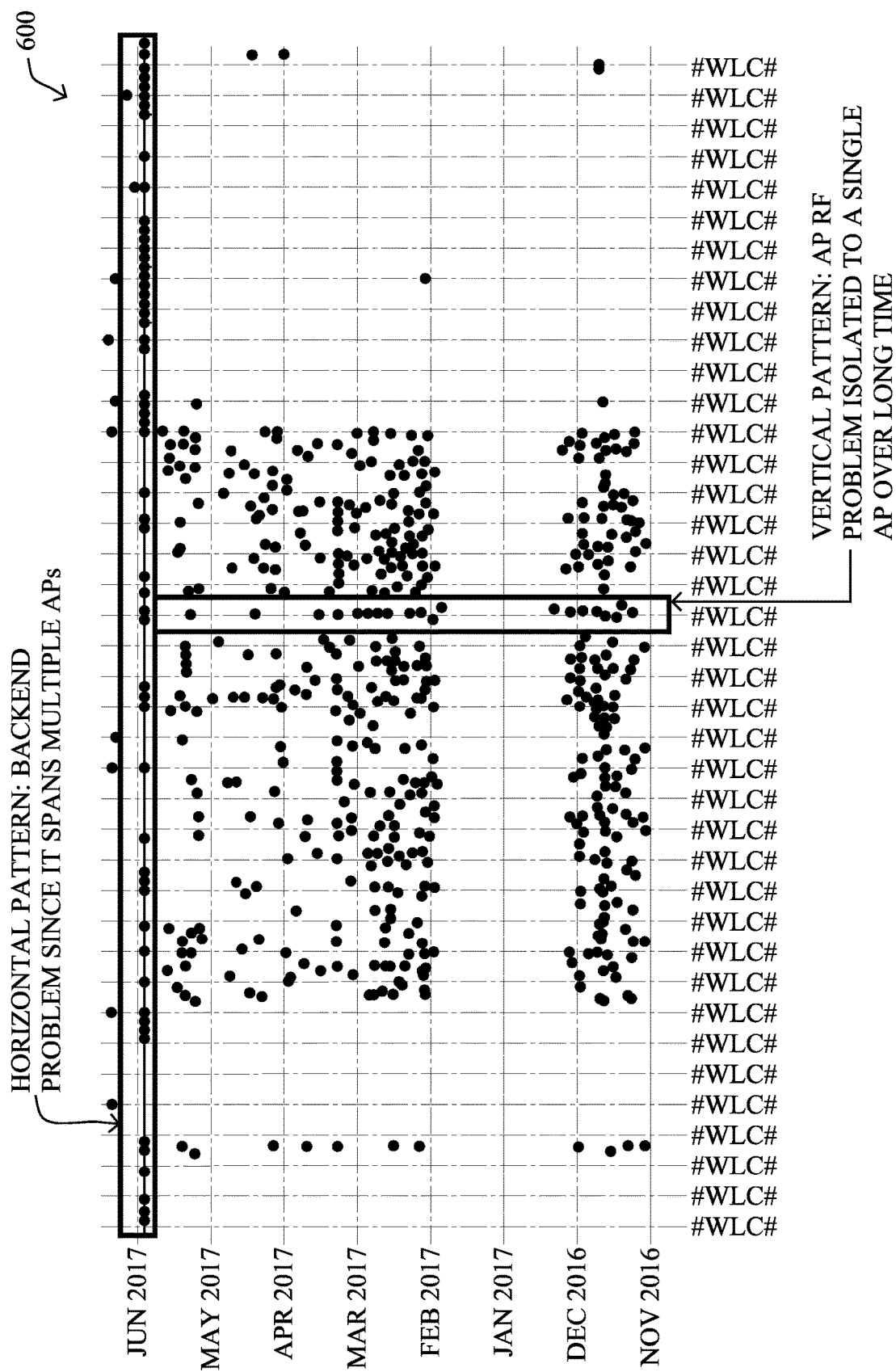
FIG. 6 illustrates an example plot of wireless anomalies detected in a network.

In another embodiment, trait classifier 408 may use a machine learning-based clustering approach to learn the labeling. To do so, trait classifier 408 may cluster the groups, based on time and APs. FIG. 6 illustrates an example plot 600 of wireless anomalies detected in a network on which trait classifier 408 may apply cluster analysis. In particular, as shown, one horizontal pattern that was observed in June 2017 spans multiple APs in the monitored network. This indicates that the anomaly is backend-related. Conversely, a vertical pattern that spans multiple points in time, but is localized to a single AP is mostly likely radio/RF-related.

Referring again to FIG. 4, another function of trait classifier 408 is to identify the APs at which radio-related anomalies/failures are significant and recurring. For example, this can be done by looking at the distribution of top APs with a high failure count. If the APs with a high failure count have a low standard deviation, this would be indicative of a consistent problem over time. Such a step is essential to avoid solving issues that are only transient (e.g., radio-related issues that are due to transient environmental conditions, etc.). Trait classifier 408 may then indicate to AP placement analyzer 410 those APs at which roaming or throughput issues were detected that are both radio-related and non-transient.

One reason for only assessing radio-related anomalies is that AP placements would not correct for backend issue like server load, as the additional AP placement is not going to help mitigate roaming failures. For that, server capacity may be increased, instead.

In various embodiments, AP placement analyzer 410 may be configured to assess the roaming or throughput anomalies experienced by the AP(s) identified by trait classifier 408, to initiate potential changes to the network that would mitigate these anomalies. For example, one such change may be the deployment of one or more additional APs to the network or, alternatively, shifting a portion of the clients from one AP to another. Note that on-boarding issues and throughput anomalies are two variables that greatly condition the overall user experience and are both excellent metric to specify an objective function (OF) consisting in determining whether adding an AP, and where, could help improving the quality of service.

In the roaming failure context, the APs with roaming problems are the origin APs, i.e., from where clients attempt to roam-out. The APs to which they are attempting to roam-in (and are failing due to RF reasons) are the destination APs.

In one embodiment, AP placement analyzer 410 may use the following methodology:

For Each (Origin) AP:
Group the origin AP and some destination APs in a group as long as the inter-AP distance is equal to or less than the median inter-AP distance in the network.
Place the new AP at the centroid of this group as this will reduce the OF for onboarding, i.e., reduce onboarding failures by distributing the clients across additional new APs.
Repeat the two above steps for the remaining destination APs for this origin AP.

Figure 7:
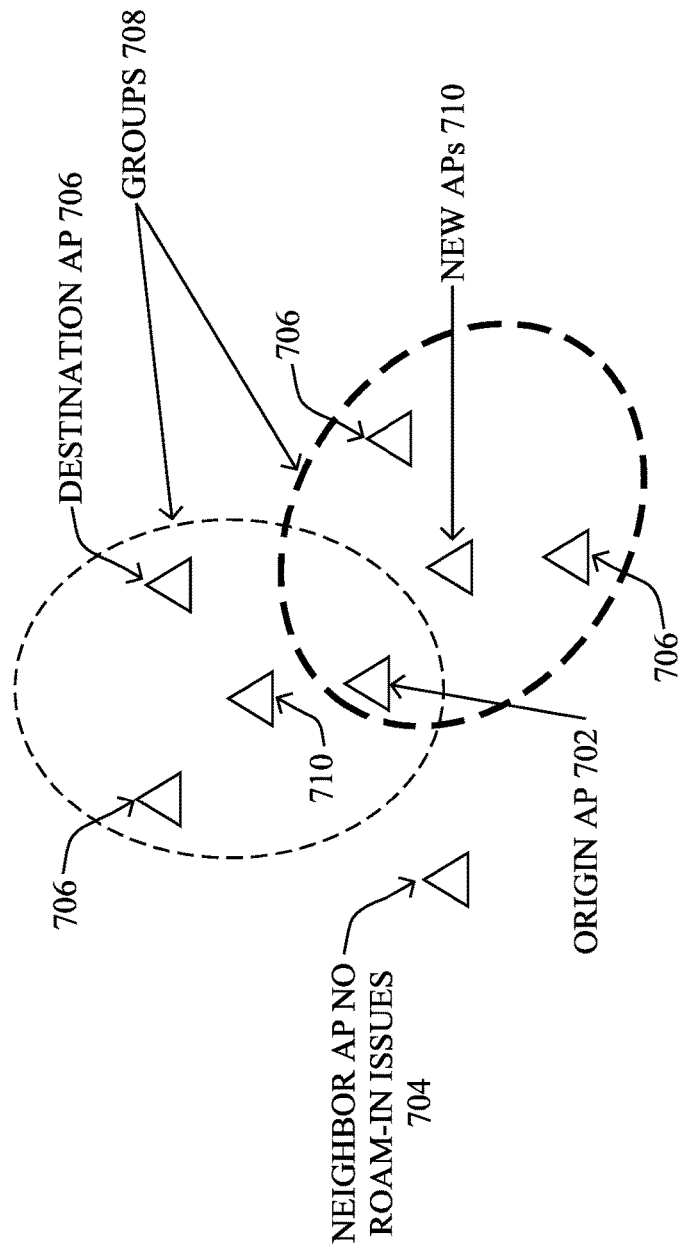
FIG. 7 illustrates an example of planning access point placement in a network.

FIG. 7 illustrates an example 700 of planning access point placement in a network, according to various embodiments. Using the above methodology, assume that radio-related roaming failures are identified between an origin AP 702 and a number of nearby destination APs 706 (the APs to which the clients were attempting to roam). Note that not all neighboring APs of origin AP 702 may be tied to the roaming failures, either. For example, there may not be any roam-in issues between origin AP 702 and its neighbor AP 704.

Once the destination APs 706 associated with the failures are identified, AP placement analyzer 710 may group AP 702 with at least a portion of APs 706, so long as their inter-AP distance is equal to or less than the median inter-AP distance in the network. Consequently, as shown, AP placement analyzer 710 may form two separate groups 708 that encompass AP 702 and the set of APs 706. In turn, AP placement analyzer 410 may identify the centroids of each group 708 for placement of a new AP 710, respectively. In other words, AP placement analyzer 410 may identify the physical location that is central to the APs in a group 708 as the potential deployment location for a new AP to the wireless network. Note that the inter-AP distance constraint may be essential, in many cases, to make sure that a single additional AP is added for clients moving in opposite direction.

In various embodiments, AP placement analyzer 410 may also emulate/simulate the predicted onboarding behavior that would result from adding the new AP(s). To do so, AP placement analyzer 410 may build a regression model with the onboarding failures with factors including any or all of the following:

Number of clients currently on the AP
Number of neighbor APs along with their distances
New onboarding request Frequency band
Height of APs/antennas
AP locations The model will be trained on the existing data set. This can then be used to predict the reduction in failure rate of the AP when additional neighbor APs are available. Moreover, in this case, AP placement analyzer 410 may then remove some new APs from consideration and check whether this significantly impacts the predicted failures. Doing so avoids over deployment of APs (e.g., excess APs).

Similarly, in throughput anomaly context, AP placement analyzer 410 may treat APs having throughput issues as the origin APs. The destination APs may be the APs to which many clients can be offloaded. Note that this information is available as the network assurance service may receive monitored signal strengths regarding the clients and neighbor APs. AP placement analyzer 410 may then consider any neighbor AP with a signal strength that exceeds a defined threshold as a candidate for the client move. For example, the neighbor APs which observe the client at a signal strength greater than −75 dBm can be considered as destination APs.

AP placement analyzer 410 may also generate a regression model on throughput values, considering factors such as any or all of the following:
Number of clients currently on the AP
Number and type of applications that the AP radio supports over time
Number of neighbor APs along with their distances
New onboarding request
Frequency band
Height of APs/antennas
AP locations In this case, with throughput under consideration along with onboarding failures, AP placement analyzer 410 can rerun the AP placement considering a new OF. For example, AP placement analyzer 410 may evaluate the impact that adding n-number of APs would have on both the onboarding failure rate and the throughput. AP placement analyzer 410 could look at each of them separately or in a combined fashion. Indeed, adding an AP may improve roaming failure rate by X % and throughput by Y %. The OF might be to find the minimum number of added AP so that the roaming failure rate is improved by X1% and the throughput improved by Y1%. The OF will specify any cost constraints of adding new APs to reduce onboarding failures and increase throughput, such as power consumption costs, etc.

In another embodiment, AP placement analyzer 410 may receive an use a specified constraint on the number of allowed new APs. For example, a network administrator operating the UI may specify how many new APs can be placed (or the cost constraints which can be transformed to a number of APs). In such a case, AP placement analyzer 410 may take a greedy approach to solving this optimization as follows:
Tag all the origin-destination AP edges which have significant onboarding failures and/or low throughput. Each of the edge has "bottleneck-weight" proportional to the number of onboarding failures.
Use a greedy iterative process to place the top-n APs by:
Picking the top edge with highest bottle-neck weight
Placing an AP at the center of the edge
Re-computing weights of all edges based on the new AP placement. For this, AP placement analyzer 410 can use a machine-learning model or simple RF geometry equations to simulate a what-if scenario. For example, AP placement analyzer 410 can build a regression model where the features are the distance between the APs, location parameters (e.g., building), and others, as specified earlier. The target variable will be number of onboarding failures and/or throughput. If such a model has good accuracy, then it can be used to simulate the effect of placement 10o of new AP.
AP placement analyzer 410 may repeat the three steps above by iteratively picking the next top edge with highest bottleneck weight. Note that if the model above is inaccurate, then AP placement analyzer 410 can choose the next edge which has: (1) a high bottle neck weight and (2) more than a certain threshold distance away from the newly computed AP.

Note that the above problem is NP-hard, and other heuristics can be developed to provide better solutions. In smaller networks with fewer APs, an optimal problem can also be solved, in some embodiments. Also, if the origin APs belong to the same WLC, then a salt and pepper deployment may be recommended (e.g., in addition to the additional APs we would recommend moving some of the origin APs to be moved to different WLC).

Once AP placement analyzer 410 has determined a change to the network, it may initiate the change. For example, AP placement analyzer 410 may provide data indicative of any suggested AP deployments and the predicted effects on the roaming failures and/or throughput anomalies that would result. Doing so allows the administrator to schedule a technician to make the change. In other embodiments, AP placement analyzer 410 may automatically effect the change, such as by causing certain clients to be moved from one AP to another, by sending an automatic work order to a technician to install an AP, or the like.

Figure 8:
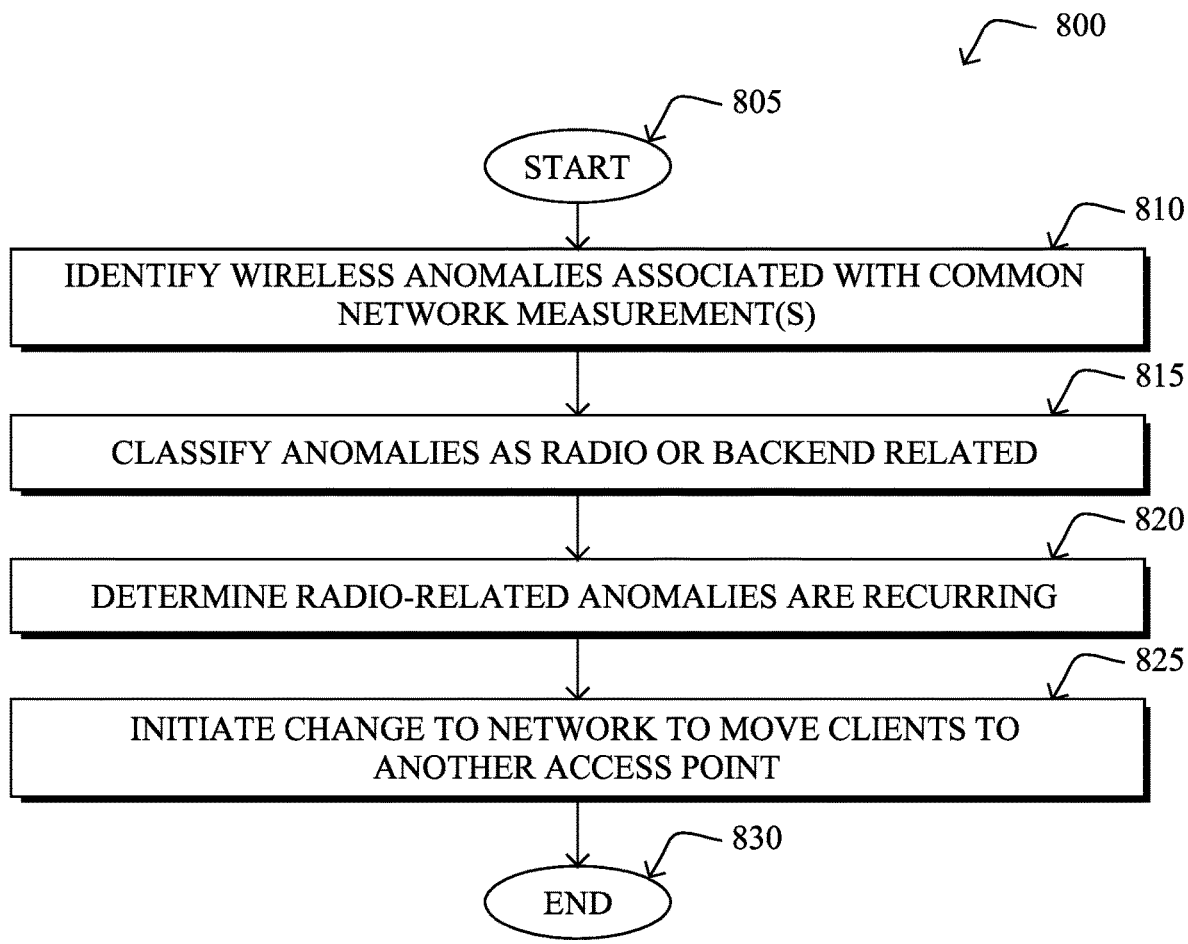
FIG. 8 illustrates an example simplified procedure for network planning using observed patterns.

FIG. 8 illustrates an example simplified procedure for network planning using observed patterns in a network in accordance with one or more embodiments described herein. For example, a non-generic, specifically configured device (e.g., device 200) may perform procedure 800 by executing stored instructions (e.g., process 248) to implement a network assurance service. The procedure 800 may start at step 805, and continues to step 810, where, as described in greater detail above, the network assurance service may identify a set of wireless network anomalies detected in the wireless network that are associated with a set of one or more network measurements. In various embodiments, the anomalies may be indicative of wireless roaming failures (e.g., the inability of a client to transition from one AP to another) and/or throughput anomalies in the wireless network.

At step 815, as detailed above, the network assurance service may classify the set of wireless anomalies as radio-related or backend-related. In various embodiments, this may entail determining whether the anomalies are observed across multiple APs at a given time or whether the anomalies are localized to a particular AP or small subset of APs. In the former case, the anomalies may be classified as backend-related while, in the latter case, the anomalies may be classified as radio-related.

At step 820, the network assurance service may determine, when the set of wireless anomalies are classified as radio-related, that the wireless anomalies are recurring for a particular wireless access point in the network, as described in greater detail above. For example, an anomaly that is localized to a particular AP and only a particular time may be due to a transient condition that can be ignored. However, if the anomalies are persistent, periodic, or otherwise recurring, the service may flag the anomalies for further analysis.

At step 825, as detailed above, the network assurance service may initiate a change to the wireless network in part to move clients in the wireless network from the particular wireless access point to another wireless access point in the network. In various embodiments, the other wireless access point may be a new AP selected by the service for deployment to the network. In further embodiments, the other wireless access point may be a neighbor of the particular access point that could potentially absorb some of its clients. The service may initiate the change by either acting automatically or, in further embodiments, by sending data to a user interface indicative of the change, to allow a network administrator to assess and implement the change. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow a network assurance service that monitors a wireless network to identify the parts of the network where onboarding failures and/or throughput anomalies are occurring, specifically due to RF reasons. In further aspects, the techniques herein can be used to recommend the deployment of additional APs to the network, to mitigate the situation, or make other changes to the network, accordingly.

While there have been shown and described illustrative embodiments that provide for network planning, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    identifying, by a network assurance service that monitors a Wi-Fi network, a set of wireless network anomalies detected in the Wi-Fi network that are associated with a set of one or more network measurements indicative of performance of the Wi-Fi network, wherein the wireless network anomalies are indicative of wireless roaming failures between access points in the Wi-Fi network or throughput anomalies detected in the Wi-Fi network;
    classifying, by the network assurance service, the set of wireless network anomalies as radio-related or back-end-related by determining whether the set of wireless network anomalies are associated with a single wireless access point or a plurality of wireless access points, wherein radio-related wireless network anomalies are indicative of issues with radiofrequency (RF) conditions;
    identifying, by the network assurance service, that the set of wireless network anomalies are classified as radio-related;
    determining, by the network assurance service and in response to identifying that the set of wireless network anomalies are classified as radio-related, that the wireless network anomalies are recurring for a particular wireless access point in the Wi-Fi network; and
    initiating, by the network assurance service, a change to the Wi-Fi network in part to move clients in the Wi-Fi network from the particular wireless access point to another wireless access point in the Wi-Fi network.

2. The method as in claim 1, wherein identifying the set of wireless network anomalies comprises:
    using, by the network assurance service, a machine learning-based anomaly detector to detect the set of wireless network anomalies.

3. The method as in claim 1, wherein, when the wireless network anomalies are indicative of wireless roaming failures between access points in the Wi-Fi network, initiating the change to the Wi-Fi network comprises:
    grouping, by the network assurance service, the particular wireless access point with one or more access points between which roaming failures occurred; and
    selecting, by the network assurance service, a centroid of the grouping as a deployment location for a new wireless access point in the Wi-Fi network.

4. The method as in claim 3, further comprising:
    training, by the network assurance service, a machine learning-based regression model to predict a reduction in roaming failures that would occur as a result of deploying the new wireless access point to the selected deployment location.

5. The method as in claim 3, wherein initiating the change to the Wi-Fi network further comprises:
    sending, by the network assurance service, an indication of the selected deployment location for a new wireless access point to a user interface.

6. The method as in claim 1, wherein, when the wireless network anomalies are indicative of throughput anomalies detected in the Wi-Fi network, initiating the change to the Wi-Fi network comprises:
    identifying, by the network assurance service, a set of access points in the Wi-Fi network to which clients can be offloaded from the particular wireless access point; and
    using, by the network assurance service, a machine learning-based regression model to assess offloading of clients from the particular access point to each of the set of access points.

7. The method as in claim 6, wherein the regression model evaluates one or more of: a number of clients attached to the particular access point, a number and type of applications supported by the particular access point, distances between the access points in the set and the particular access point, a frequency band used by the access points in the set, physical locations of the particular access point and the access points in the set, or access point heights.

8. The method as in claim 6, wherein the wireless network anomalies are further indicative of wireless roaming failures, wherein the set of access points comprise one or more potential access points that could be deployed to the Wi-Fi network, and wherein the regression model uses an objective function that seeks to identify a minimum number of potential access points that are predicted to increase throughput and decrease roaming failures by a threshold amount.

9. An apparatus, comprising:
one or more network interfaces to communicate with a Wi-Fi network;
a processor coupled to the network interfaces and configured to execute one or more processes; and
a memory configured to store a process executable by the processor, the process when executed configured to:
identify a set of wireless network anomalies detected in the Wi-Fi network that are associated with a set of one or more network measurements indicative of performance of the Wi-Fi network, wherein the wireless network anomalies are indicative of wireless roaming failures between access points in the Wi-Fi network or throughput anomalies detected in the Wi-Fi network;
classify the set of wireless network anomalies as radio-related or backend-related by determining whether the set of wireless network anomalies are associated with a single wireless access point or a plurality of wireless access points, wherein radio-related wireless network anomalies are indicative of issues with radiofrequency (RF) conditions;
identify that the set of wireless network anomalies are classified as radio-related;
determine, in response to identification that the set of wireless network anomalies are classified as radio-related, that the wireless network anomalies are recurring for a particular wireless access point in the Wi-Fi network; and
initiate a change to the Wi-Fi network in part to move clients in the Wi-Fi network from the particular wireless access point to another wireless access point in the Wi-Fi network.

10. The apparatus as in claim 9, wherein the apparatus identifies the set of wireless network anomalies by:
using a machine learning-based anomaly detector to detect the set of wireless network anomalies.

11. The apparatus as in claim 9, wherein, when the wireless network anomalies are indicative of wireless roaming failures between access points in the Wi-Fi network, the apparatus initiates the change to the Wi-Fi network by:
grouping the particular wireless access point with one or more access points between which roaming failures occurred; and
selecting a centroid of the grouping as a deployment location for a new wireless access point in the Wi-Fi network.

12. The apparatus as in claim 11, wherein the process when executed is further configured to:
train a machine learning-based regression model to predict a reduction in roaming failures that would occur as a result of deploying the new wireless access point to the selected deployment location.

13. The apparatus as in claim 12, wherein the apparatus initiates the change to the Wi-Fi network by:
sending an indication of the selected deployment location for a new wireless access point to a user interface.

14. The apparatus as in claim 9, wherein, when the wireless network anomalies are indicative of throughput anomalies detected in the Wi-Fi network, the apparatus initiates the change to the Wi-Fi network by:
identifying a set of access points in the Wi-Fi network to which clients can be offloaded from the particular wireless access point; and
using a machine learning-based regression model to assess offloading of clients from the particular access point to each of the set of access points.

15. The apparatus as in claim 14, wherein the regression model evaluates one or more of: a number of clients attached to the particular access point, a number and type of applications supported by the particular access point, distances between the access points in the set and the particular access point, a frequency band used by the access points in the set, physical locations of the particular access point and the access points in the set, or access point heights.

16. The apparatus as in claim 14, wherein the wireless network anomalies are further indicative of wireless roaming failures, wherein the set of access points comprise one or more potential access points that could be deployed to the Wi-Fi network, and wherein the regression model uses an objective function that seeks to identify a minimum number of potential access points that are predicted to increase throughput and decrease roaming failures by a threshold amount.

17. A tangible, non-transitory, computer-readable medium storing program instructions that cause a network assurance service that monitors a Wi-Fi network to execute a process comprising:
identifying, by the network assurance service, a set of Wi-Fi network anomalies detected in the Wi-Fi network that are associated with a set of one or more network measurements indicative of performance of the Wi-Fi network, wherein the wireless network anomalies are indicative of wireless roaming failures between access points in the Wi-Fi network or throughput anomalies detected in the Wi-Fi network;
classifying, by the network assurance service, the set of wireless network anomalies as radio-related or backend-related by determining whether the set of wireless network anomalies are associated with a single wireless access point or a plurality of wireless access points, wherein radio-related wireless network anomalies are indicative of issues with radiofrequency (RF) conditions;
identifying, by the network assurance service, that the set of wireless network anomalies are classified as radio-related;
determining, by the network assurance service and in response to identifying that the set of wireless network anomalies are classified as radio-related, that the wireless network anomalies are recurring for a particular wireless access point in the Wi-Fi network; and
initiating, by the network assurance service, a change to the Wi-Fi network in part to move clients in the Wi-Fi network from the particular wireless access point to another wireless access point in the Wi-Fi network.

18. The computer-readable medium as in claim 17, wherein, when the wireless network anomalies are indicative of wireless roaming failures between access points in the Wi-Fi-network, initiating the change to the Wi-Fi network comprises:
grouping, by the network assurance service, the particular wireless access point with one or more access points between which roaming failures occurred; and selecting, by the network assurance service, a centroid of the grouping as a deployment location for a new wireless access point in the Wi-Fi network.

\* \* \* \* \*

UNITED STATES PATENT AND TRADEMARK OFFICE
CERTIFICATE OF CORRECTION

PATENT NO. : 10,887,781 B2
APPLICATION NO. : 15/880617
DATED : January 5, 2021
INVENTOR(S) : Santosh Ghanshyam Pandey et al.

It is certified that error appears in the above-identified patent and that said Letters Patent is hereby corrected as shown below:

In the Specification

Column 7, Line 19, should read:
ratio of true positives the sum of true and false positives.

Column 7, Line 43, should read:
AP1 through nth access point, APn) through which endpoint Column 7, Line 58, should read:
AP1 through nth access point APm) that provide connectiv- Column 11, Line 35, should read:
the RF-related anomalies/issues to assess potential Column 12, Line 9, should read:
implemented as its own stand-alone service, either as part Column 16, Line 6, should read:
effect of placement of new AP.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*